United States Patent [19]

Goda et al.

[11] Patent Number: 5,796,539
[45] Date of Patent: Aug. 18, 1998

[54] MAGNETIC DISK APPARATUS FOR A MAGNETIC DISK HAVING PROJECTIONS PROVIDED THEREON

[75] Inventors: Noriyoshi Goda; Fuminobu Maruyama; Masayuki Suzuki, all of Odawara, Japan

[73] Assignee: Hitachi, Ltd., Tokyo, Japan

[21] Appl. No.: 678,068

[22] Filed: Jul. 10, 1996

[30] Foreign Application Priority Data

Jul. 20, 1995 [JP] Japan ................... 7-183830

[51] Int. Cl.⁶ ............... G11B 27/24; G11B 15/46
[52] U.S. Cl. .................. 360/73.03; 360/97.01
[58] Field of Search ................ 360/75, 73.03, 360/70, 77.02, 135

[56] References Cited

U.S. PATENT DOCUMENTS

| | | | |
|---|---|---|---|
| 4,918,556 | 4/1990 | Ezaki et al. | |
| 4,931,338 | 6/1990 | Toffle | 428/65 |
| 5,232,750 | 8/1993 | Onodera et al. | |
| 5,412,519 | 5/1995 | Buettner et al. | 360/75 X |
| 5,594,595 | 1/1997 | Zhu | 360/75 X |
| 5,631,408 | 5/1997 | Baumgart et al. | 73/1.81 |

FOREIGN PATENT DOCUMENTS

| | | |
|---|---|---|
| A 464786 | 1/1992 | European Pat. Off. |
| A 583989 | 2/1994 | European Pat. Off. |
| A 655734 | 5/1995 | European Pat. Off. |
| 6-111293 | 4/1994 | Japan |
| 6-111294 | 4/1994 | Japan |
| 7-65566 | 3/1995 | Japan |
| 7-296379 | 11/1995 | Japan |
| WO93/12520 | 6/1993 | WIPO |

*Primary Examiner*—Thang V. Tran
*Assistant Examiner*—Kin Wong
*Attorney, Agent, or Firm*—Fay, Sharpe, Beall, Fagan, Minnich & McKee

[57] ABSTRACT

In a magnetic disk apparatus including a magnetic head and a magnetic disk medium having projections provided with a constant regularity, a rotating portion for driving the rotation of the magnetic disk medium is controlled by a control section in accordance with the regularity of the projections provided on the magnetic disk medium, a resonance frequency of the magnetic head and a relative speed of the magnetic disk medium to the magnetic head in order to prevent the resonance of the magnetic head from being caused by the projections of the magnetic disk medium. With such a construction, it is possible to realize the stabilization of floatation of the magnetic head in the magnetic disk apparatus, thereby providing a magnetic disk apparatus which has a low floating height and a high reliability.

19 Claims, 3 Drawing Sheets

MAGNETIC DISK APPARATUS FOR A MAGNETIC DISK HAVING PROJECTIONS PROVIDED THEREON

BACKGROUND OF THE INVENTION

The present invention relates to an information recording magnetic disk apparatus, and more particularly to a magnetic disk apparatus which has a high reliability and an excellent recording characteristic at a high recording density.

In recent years, the floating height of a magnetic head in a magnetic disk apparatus shows a yearly decrease with an increase in recording density. Also, a slider forming the magnetic head is miniaturized every year. For example, the slider of the magnetic head has a change in size from the conventional type of slider to a 70% slider (or a slider having a size reduced to 70% of the size of the conventional type of slider), a 50% slider and a slider smaller than that.

In such a magnetic disk apparatus, however, a magnetic head has an increased possibility that when the magnetic head is floating, it contacts a magnetic disk medium which rotates at a high speed. Especially, there is a fear that the oscillation of the magnetic head at the time of floatation causes the damage of the magnetic disk medium. JP-A-7-65566 has disclosed that the characteristic frequency of a magnetic head inclusive of a supporting member is not to coincide with the characteristic frequency of a magnetic disk medium when the medium is mounted to a magnetic disk apparatus. More particularly, it has been disclosed that the optimization of the mass of a core, the material of a suspension or the like in regard of the magnetic head and the optimization of the material of a substrate or the like in regard of the magnetic disk medium are preferable.

On the other hand, it is conventionally known that a magnetic disk medium including an Al (aluminum) substrate subjected to texture treatment is used as a magnetic disk medium applied to a magnetic disk apparatus which requires a high recording density and a high reliability. Also, there is known a magnetic disk apparatus in which a glass substrate is used, especially from the aspect of low floatation and impact resistance, in order to cope with a further increased recording density while obtaining a high reliability.

In lieu of the above-mentioned conventional method in which concentrically circular or crossed grooves called texture are formed on the substrate of a magnetic disk medium, there are a method in which projections are formed on a substrate by etching (JP-A-6111293) and a technique in which a projection-like pattern is defined on a substrate by a photolithographic process to improve the absorptivity to a magnetic head and the durability against sliding, even when the magnetic head floats on the magnetic disk medium at a low floating height (JP-A-6-111294).

The JP-A-6-111293 and the JP-A-6-111294 have no consideration for problems caused when a magnetic disk medium provided with projections having a regularity is applied to a magnetic disk apparatus. Though the JP-A-7-65566 has pointed out the characteristic frequency of a magnetic disk medium, it has only the disclosure that the optimization of the material of the substrate of the magnetic disk medium or the like is preferable. This reference has no investigation about a resonance phenomenon of a magnetic head caused by projections provided with a specified regularity on the surface of the magnetic disk medium and has not even a suggestion as to specific means for solving this problem.

SUMMARY OF THE INVENTION

The present inventors examined magnetic disk apparatuses using those ones of magnetic disk mediums subjected to etching or photolithographic process in which projections formed on the medium surface have a regularity. As the result of examination, it was revealed that when a fixed relationship is generated between the characteristic frequency of a magnetic head, the rotation speed of the disk and the floating position of the magnetic head, the magnetic head begins to resonate so that the head cannot make stable floatation.

An oscillation sensed by the magnetic head was measured with an AE sensor or piezoelectric element stuck to the magnetic head. When the measurement was made for a medium having projections formed at equal intervals, the beat of the magnetic head was observed at four locations on one circumference of the medium. Also, when a relative speed between the magnetic disk medium and the magnetic head was increased, a beat was generated at an increased relative speed which is integer times as high as the relative speed at which the beat generated first.

It was found out that the above phenomenon can be represented by the relational expression of $$n \times f = v/l \tag{1}$$

where l is the intervals between projections provided with a regularity on the magnetic disk medium surface, f is the resonance frequency of a slider determined by the size and material thereof, v is the relative speed, and n is an integer or 1/(integer).

Accordingly, when a magnetic head floats at a low floating height on a magnetic disk medium provided with projections having a regularity, there may be a possibility that an unstable oscillation is generated in the magnetic head so that the magnetic head contacts the magnetic disk medium with a relative speed kept therebetween, thereby damaging a protection film and a magnetic film of the medium. Also, if at least a portion on the magnetic disk medium satisfies the relation represented by the relational expression (1), there is a fear that the magnetic head oscillates at that position so that the head damages the protection film and the magnetic film.

An object of the present invention made for solving the above-mentioned problem and directed to a magnetic disk apparatus using a magnetic disk medium in which projections formed on a substrate or medium surface in an intermediate layer of the medium are arranged at equal intervals or regularly, is to provide such a magnetic disk apparatus which has a high reliability and is adaptable to high-density recording.

In order to achieve the above object, a magnetic disk apparatus according to an embodiment of the present invention has the following constructions.

(1) In a magnetic disk apparatus comprising at least a magnetic disk medium used for magnetic recording and having projections provided at regular intervals on the surface thereof, a magnetic head, a rotating portion for generating a relative speed between the magnetic disk medium and the magnetic head, an actuator for moving the position of the magnetic head, and a controller for controlling the actuator and the rotating portion, the rotation speed of a spindle, the position of the actuator or both thereof is controlled by the controller so as to cause the departure from the conditional equation (or the relational expression (1)) for generation of a resonance caused by the projections of the magnetic disk medium and the magnetic head, thereby making it possible to realize the stable floatation of the magnetic head. At this time, the relative speed between the head and the medium generated by the rotating portion may be not only fixed but also variable so long as it is out of the condition of resonance generation.

(2) A resonance frequency is established by the use of a high resonance frequency material or a low resonance frequency material as the material of a slider of the magnetic head or by the combination of the dimension and material of the slider so that the relational expression (1) is not satisfied. Thereby, the stabilization of floatation of the magnetic head is attained.

(3) A magnetic disk medium with the regular intervals between projections on the medium surface defined to be out of the relational expression (1) is used to construct a magnetic disk apparatus, thereby making the stable floatation of the magnetic head possible.

According to the magnetic disk apparatus of the present invention comprising at least the magnetic disk medium used for magnetic recording and having projections provided at regular intervals on the surface thereof, the magnetic head, the rotating portion for generating a relative speed between the magnetic disk medium and the magnetic head, the actuator for moving the position of the magnetic head, and the controller for controlling the actuator and the rotating portion, the actuator and the rotating portion are controlled for the prevention of generation of the beat of the magnetic head so that a relationship between the intervals l between the projections of the magnetic disk medium, the resonance frequency f of the magnetic head and the relative speed v is represented by the relational expression of $$n \times f < v/l \text{ or } n \times f > v/l \qquad (2)$$

where n is an integer or 1/(integer).

In this case, the resonance of the magnetic head is not generated at a fixed relative speed and even at a variably changed relative speed, thereby making it possible to realize the stable floatation of the magnetic head.

The suppression of the resonance of the magnetic head or the stable floatation of the magnetic head can also be realized by setting the rotation speed of the magnetic disk apparatus to a rotation speed at which the resonance of the magnetic head (or more particularly a slider having a magnetic head element mounted thereon) is not generated, that is, by selecting the rotation speed to a value which is not integer times as large as or 1/(integer) of the resonance frequency of the slider. With such a construction, there is provided a magnetic disk apparatus which has a high reliability and is adapted to high-density recording. In this case, there is no need to positively set each of the resonance frequency of the slider of the magnetic head and the projections of the magnetic disk medium so that no resonance is generated. It is only required that at least the rotation speed of the magnetic disk medium be controlled to satisfy the relational expression (2).

According to the present invention, the optimum resonance frequency can be established by the use of a high resonance frequency material or a low resonance frequency material as the material of a slider of the magnetic head or by the combination of the dimension and material of the slider so that the relational expression (2) is satisfied. With such a construction, it is possible to suppress the resonance of the slider of the magnetic head, thereby realizing the stable floatation of the magnetic head. At this time, since the resonance is caused if the fluctuations of the resonance frequency are within ±15% of a set value, the setting to a resonance frequency different by at least ±15% is preferable. Also, it is preferable that a resonance frequency possessed by a magnetic head supporting mechanism for supporting the magnetic head by the actuator (or more particularly, a gimbal for fixing the slider with a certain degree of freedom, a load arm for supporting the magnetic head and the gimbal to connect them to the actuator, and a signal transmitting portion for electrically connecting the magnetic head and a signal processing portion) and a resonance frequency possessed by the magnetic head and the slider are introduced into the relational expression (2) to control the rotation of the magnetic disk medium.

Further, by constructing a magnetic disk apparatus by setting the intervals l between projections on the magnetic disk medium to satisfy the relational expression (2), that is, by making the intervals l between projections sufficiently large or sufficiently small or by continuously changing the intervals between projections under a constant condition to provide intervals which do not meet with the resonance frequency, it is possible to realize the stable floatation of the magnetic head. In this case, it is preferable that the intervals between projections are not smaller than 0.005 µm (more preferably, not smaller than 0.1 µm) and the projection height is not smaller than at least 3 nm. At this time, the distribution of projection heights may be arbitrary so long as it is in a range in which the reliability of sliding is ensured. Namely, there is no special restriction to the height. In the case where projections are arranged at equal intervals, the variations of the intervals between projections up to ±15% of a set value in the circumferential direction or the travel direction of the magnetic disk medium relative to the magnetic head are in a permissible range. Further, in the case of a medium in which the intervals between projections change, the resonance of the magnetic head is not generated unless a part of the intervals meets with the resonance condition. In this case, therefore, the intervals between projections may be arbitrary so long as the intervals satisfy the relational expression (2). However, it is necessary that the intervals between projections are set to values different by at least ±15% of the head resonance frequency set by the relational expression (2). Further, it is preferable that the relational expression (2) is satisfied even when the magnetic head moves at the time of seek.

DESCRIPTION OF THE PREFERRED EMBODIMENTS

Embodiments of the present invention will now be explained in detail by use of the accompanying drawings.

Figure 1:
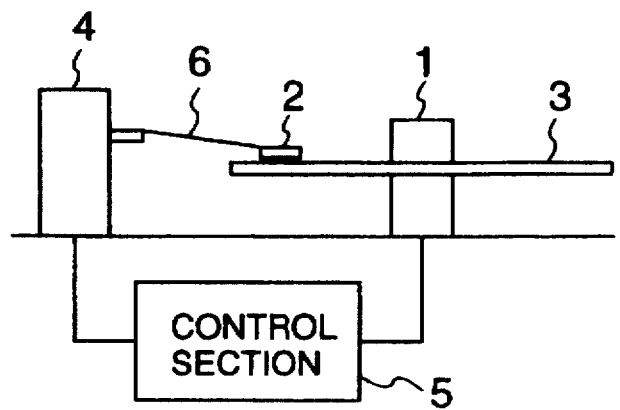
FIG. 1 is a view showing a main part of a magnetic disk apparatus according to an embodiment of the present invention.

FIG. 1 is a view showing a main part of a magnetic disk apparatus according to an embodiment of the present invention. In FIG. 1, reference numeral 3 denotes a magnetic disk medium, numeral 1 a spindle for rotating the magnetic disk medium 1, numeral 2 a magnetic head including a slider which is made of a ceramic material such as alumina titan carbide or the like and on which a magnetic head element for performing magnetic recording and reproduction is mounted, numeral 4 an actuator for positioning the magnetic head 2 to a desired position on the magnetic disk medium 3 through a magnetic head supporting mechanism 6 including a gimbal, a load arm and so forth, and numeral 5 a control section for controlling the actuator 4 and the spindle 1. The magnetic head 2 is designed such that it floats at a predetermined height on the magnetic disk medium 3 which rotates. The magnetic disk medium 3 may include several thin films inclusive of a magnetic film formed on a non-magnetic substrate made of aluminum, alloy of aluminum, glass or the like.

The magnetic disk medium 3 used in the present embodiment includes a substrate of alloy of aluminum the smooth surface of which is Ni—P plated, and a non-magnetic underlaying film of Cr or the like, a magnetic film of Co-containing alloy and a non-magnetic coating or protection film of carbon or the like which are successively formed on the substrate. A projection pattern is formed on the non-magnetic protection film by a photolithographic process using a mask so that predetermined dot forms are arranged at equal intervals. A lubricating film made of perfluoroalkylpolyether is formed on the non-magnetic protection film having the projection pattern. It is needless to say that the following embodiments are not limited to the magnetic disk medium having the above-mentioned construction and can also be applied to a magnetic disk medium having another construction. Embodiments of a magnetic disk apparatus having at least the above-mentioned constituent elements will be explained in detail.

(Embodiment 1)

The magnetic head 2 used in the present embodiment includes a slider of alumina titan carbide having the length of 2.0 mm, the width of 1.6 mm and the thickness of 0.4 mm. Two rails of 250 μm width for receiving a positive floating air pressure are provided on a surface of the slider opposite to the magnetic disk medium 3. The magnetic head is provided with a magnetic head element for performing magnetic recording and reproduction. Hereinafter, this magnetic head will be referred to as magnetic head I.

A magnetic head used for comparison (hereinafter referred to as magnetic head II) includes a slider of alumina titan carbide having the length of 4.0 mm, the width of 3.2 mm and the thickness of 0.8 mm. Two rails of 200 μm width are provided for the slider in order to provide the same floating height as that of the magnetic head I.

Figure 2:
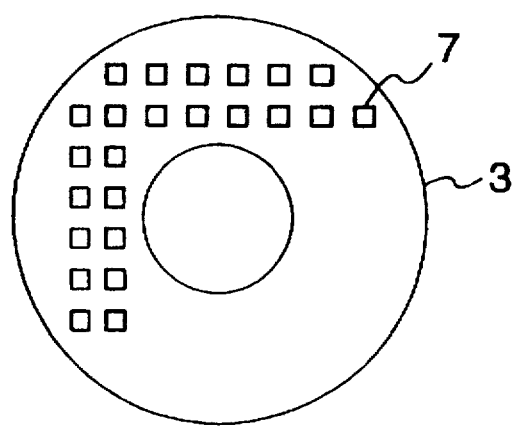
FIG. 2 is a view showing projections arranged on the surface of a magnetic recording medium according to an embodiment of the present invention.

The magnetic disk medium 3 used in the present embodiment is provided in such a manner that films required as a magnetic recording medium, that is, an underlying film, a magnetic recording film, a protection film and a lubricating film are successively formed on a substrate of aluminum alloy having the outer diameter of 95 mmø, the inner diameter of 25 mmø and the thickness of 0.80 mm, and dot-like projections 7 having the height of 20 nm and a square cross section with each side of 11.5 m are thereafter formed at intervals of 50 μm on the uppermost surface portion, as shown in FIG. 2.

Examination was made of the floating state of the magnetic head 2 (magnetic head I and magnetic head II) when a relative speed of the magnetic disk medium 3 to the floating magnetic head 2 is changed between 8 m/s and 35 m/s. A resonance frequency of the magnetic head 2 is 720 kHz in the case of the magnetic head I and 440 kHz in the case of the magnetic head II. The radial position of the magnetic head floating on the magnetic disk medium is 40 nm.

Figure 3:
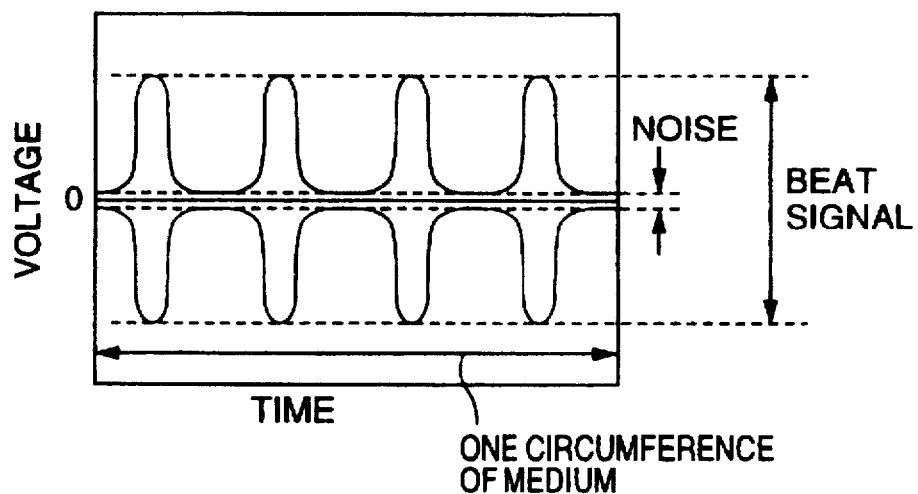
FIG. 3 is a diagram showing the result of observation of a piezoelectric voltage by an oscilloscope over one rotation when a magnetic recording medium according to the embodiment of the present invention is used.

The result of observation of the floating state of the magnetic head 2 (magnetic head I and magnetic head II) under the above condition will now be explained. In order to examine the stability of floatation of the magnetic head, a piezoelectric element is stuck just over the magnetic head. FIG. 3 is a diagram showing the result of observation of a voltage signal obtained by displaying an output from the piezoelectric element by use of an oscilloscope with the amplifier gain of 60 dB. As the result of observation for the magnetic head I having the resonance frequency of 720 kHz, a beat signal caused from a large disturbance of the floating state of the magnetic head were detected, as shown in FIG. 3, in the cases where the relative speed is 9 m/s, 18 m/s and 27 m/s. At least four such beat signals as shown in FIG. 3 were observed at equal intervals during one rotation of the magnetic disk medium.

As to the magnetic head II as the comparative example, a large disturbance of the floating state of the magnetic head was observed in the cases where the relative speed of the magnetic disk medium to the magnetic head is 11 m/s, 22 m/s and 33 m/s. At least four such large disturbances were observed at equal intervals during one rotation of the magnetic disk medium, as shown in FIG. 3.

In the above experiments, both the magnetic head I and the magnetic head II took the floating state of 50 nm at the relative speed of 8 m/s. From the result of experiments, it was revealed that no sharply rising signal is observed as a projection contact signal indicating the contact with the projections provided on the magnetic disk medium. Therefore, it is apparent that the beat signal shown in FIG. 3 is not a signal caused by the contact with the projections of the magnetic disk medium. More particularly, the signal caused by the contact with projections is a signal generated by an oscillation caused when the magnetic disk medium and the magnetic head contact each other. The rising of this signal is harp and the signal strength thereof is large. In comparison with the signal caused by the contact with projections, the beat signal observed in the present embodiment has a small signal strength. Therefore, it can be recognized that the cause of generation of the beat signal is different from that of the projection contact signal.

As mentioned above, the large beat signal (hereinafter referred to as head unstable-floatation signal) was generated or confirmed under the relative speed conditions of 9, 18 and 27 m/s in the case of the magnetic head I having the resonance frequency of 720 kHz and under the relative speed conditions of 11, 22 and 33 m/s in the case of the magnetic head II having the resonance frequency of 440 kHz. The signal observation was also made at other relative speeds. However, no head unstable-floatation signal resulting from beat was generated at the other relative speeds. Considering the fact that the distance from the projection 7 to the projection 7 was 50 μm, it was found from the above that a head unstable-floatation signal resulting from the beat of the magnetic head is generated when the relational expression (1) is satisfied. Accordingly, when the relational expression (2) is satisfied, no large head unstable-floatation signal is generated and the magnetic head can make stable floatation.

The intervals between projections on the magnetic disk medium were measured by a contact type form measuring instrument and the distribution of intervals between projections was analyzed by the Fourier expansion. As the result of analysis, the distribution of intervals between projections showed the spread of ±7.5µm around 50 µm. From this, it was confirmed in conjunction with the definition of a regularity that the fluctuations of intervals between projections not greater than ±15% of the central value result in the generation of the beat of the magnetic head. As to each of the relative speed v and the resonance frequency f of the slider of the magnetic head in the relational expression (2), it was similarly confirmed that the beat is generated for the distribution of fluctuations in speed or frequency not greater than ±15%. The herein used term "fluctuations" mainly includes "variations". In the present embodiment, however, the term "fluctuations" is used in a concept including the case where there is "varied" by intention.

Next, the investigation was made of the floating characteristic of the magnetic head when the magnetic disk medium is normally rotated. There was fabricated a magnetic disk apparatus in which the magnetic head I having the size of 2.0 mm length, 1.6 mm width and 0.4 mm thickness and the resonance frequency of 720 kHz is used in conjunction with a magnetic disk medium in which the intervals between projections on the circumference of the medium are 50 µm. The rotation speed of the magnetic disk medium is 3600 rpm at the innermost circumference position. In this magnetic disk apparatus, the spindle rotation speed is variably controlled by a controller.

The innermost circumference position of the magnetic disk medium, at which the magnetic head can be positioned, is 20 mm and the relative speed at this time is 7.5 m/s. Also, the outermost circumference position of the magnetic disk medium, at which the magnetic head can be positioned, is 45 mm. At the innermost circumference of the lowest speed, the magnetic head of this apparatus makes the floatation of 60 nm and no signal indicating the contact with the magnetic disk medium is generated from the magnetic head. The floatation of 60 nm is ensured over the entire surface of the magnetic disk medium.

When the magnetic disk medium is normally rotated under the above condition so that the position of the magnetic head is changed up to the outermost circumference, the relative speed at the outermost circumference comes to 17.0 m/s. At an intermediate circumference area where the the position of the magnetic head changes, the change of the relative speed from 9.4 m/s to 12.7 m/s is expected. When considering the relational expression (1) in this area, it is expected that a beat signal of the magnetic head is observed. In the magnetic disk apparatus under investigation, therefore, in an area having a radius not smaller than 24.9 mm where the relative speed comes to 9.4 m/s or higher than that, the rotation speed of the magnetic disk medium was controlled by the controller at the pitch of 1 mm in respect to the radial position of the magnetic head to variably decrease the rotation speed so that the relative speed assumes a fixed value of 9.0 m/s. The controller acquires information from the actuator concerning the position of the magnetic head to control the rotation speed of the spindle on the basis of the acquired position information.

For comparison, there was fabricated a magnetic disk apparatus in which the setting for the magnetic disk medium and the magnetic head is similar to that in the above-mentioned magnetic disk apparatus but the rotation speed of the magnetic disk medium is fixed at 3600 rpm irrespective of the position of the magnetic head. These two kinds of magnetic disk apparatuses were subjected to the examination of a beat signal of the magnetic head at various positions of the magnetic head. In the magnetic disk apparatus with the rotation speed of the magnetic disk medium being controlled by the controller, no beat signal was observed. On the other hand, in the magnetic disk apparatus with the rotation speed of the magnetic disk medium being fixed, the generation of a beat signal begun at the 25.0 mm radius position of the magnetic head. The maximum voltage amplitude of the beat signal was generated at the 29.2 mm radius position, that is, under the condition that the relative speed is 11.0 m/s. Accordingly, the above investigation shows that the floatation of the magnetic head could be stabilized by controlling the position of the magnetic head and the rotation speed of the magnetic disk medium by the controller.

In addition to the above-mentioned magnetic disk apparatus of the present invention, there was further fabricated a magnetic disk apparatus in which an area of the magnetic disk medium including the head positions from 20 mm to 45 mm is divided into five regions and the relative speed is controlled for each region so that it becomes not higher than 9.4 m/s, or more particularly, the rotation speed is made variable such that it takes 3500 rpm in the region from 20 nm to 25 nm, 2900 rpm in the region from 25 nm to 30 nm, 2500 rpm in the region from 30 nm to 35 nm, 2200 rpm in the region from 35 nm to 40 nm, and 1900 rpm in the region from 40 nm to 45 nm. In this case too, the beat of the magnetic head was not observed.

(Embodiment 2)

As the magnetic disk medium 3 was used a magnetic disk medium in which cylindrical projections 7 having the diameter of 5.7 pm and the height of 25 nm are arranged at intervals of 25.5 pm on a glass substrate having the outer diameter of 65 mmø, the inner diameter of 20 mmø and the thickness of 0.889 mm. As the magnetic head 2 was used a magnetic head in which two worked rails of 250 µm width for receiving a positive floating air pressure are provided on a slider of alumina titan carbide having the length of 2.0 mm, the width of 1.6 mm and the thickness of 0.4 mm. The magnetic head 2 was provided opposite to the magnetic disk medium 3 so that the magnetic head floats on the magnetic disk medium. The magnetic head used in the present embodiment also has a resonance frequency of 720 kHz.

In the present embodiment too, a head unstable-floatation signal was observed when the relative speed of the magnetic disk medium is 9 m/s, 18 m/s and 27 m/s. Though the intervals between projections in the case of the present embodiment are one half of that in Embodiment 1 and the size and form of the projection are different from those in Embodiment 1, it was found out that when the relational expression (1) is satisfied, the unstable-floatation signal is generated. The projection form of the medium is not limited to the case where projections are uniform. Namely, it was revealed that even in the case where small projections gather to form one aggregate, a beat signal is generated if such aggregates are arranged at equal intervals or with a certain regularity. In the present embodiment, a beat signal of the head slider could be sensed if the projection height is equal to or greater than at least 3 nm.

Figure 4:
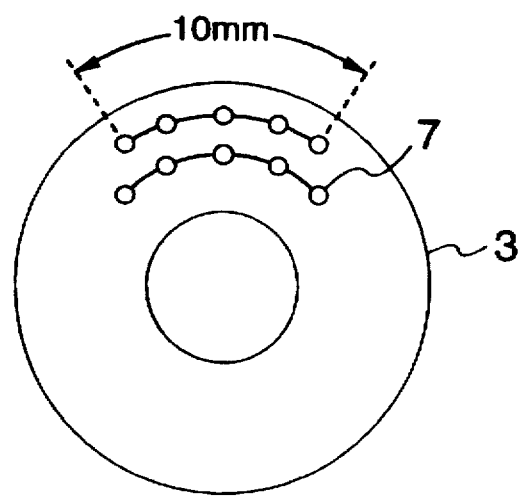
FIG. 4 is a view showing projections arranged on the surface of a magnetic recording medium according to another embodiment of the present invention.

Next, a similar measurement was made preparing a magnetic disk medium in which cylindrical projections 7 having the diameter of 5.7 µm and the height of 15 nm are arranged at intervals of 25.5 µm on a portion of the circumference (over the length of 10 mm in the circumferential direction) and the cylindrical projections 7 are arranged at intervals of 40 µm on the other portions, as shown in FIG. 4. At the relative speed of 9 m/s, a head unstable-floatation signal was observed over a time length of about 1.5 ms at only one location in the range of measurement corresponding to one circumference. From this, it was confirmed that a head unstable-floatation signal is generated only at a position where the relational expression (1) is satisfied.

Namely, it was revealed that a group of projections passing under the rail width give an influence on the generation of a beat signal. More particularly, it was revealed in the present investigation that when a row of projections pass at least one of the two rails, a beat signal is generated in the case where the intervals between projections and the resonance frequency of the magnetic head coincide with each other. At this time, the passage of a row or group of projections is not limited to the case where the passage is continuative. The beat signal was generated if the passage time is equal to or shorter than at least 10 μs. Further, it was found out that the generation of a beat signal begins at the size of the projection 7 relative to the rail which is about 1/500 in terms of the ratio to the rail width. Therefore, it is necessary to set the size of the projection so that it is not greater than 1/500 of the rail width.

Figure 5:
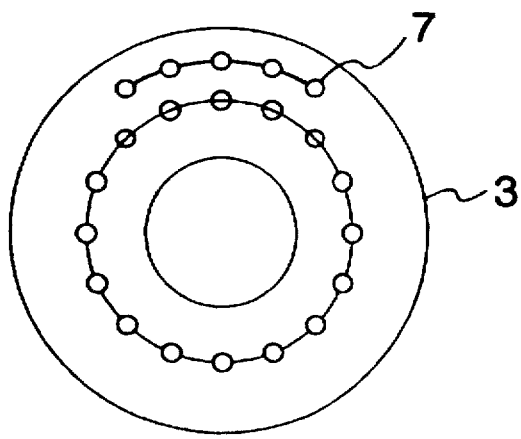
FIG. 5 is a view showing projections arranged on the surface of a magnetic recording medium according to a further embodiment of the present invention.

Next, a magnetic disk medium as shown in FIG. 5 having cylindrical projections of 5.7 μm diameter and 15 nm height arranged at intervals of 25.5 μm on the same circumference of a glass substrate having the outer diameter of 65 mmø, the inner diameter of 20 mmø and the thickness of 0.889 mm was used to float thereon a magnetic head slider in which rails of 250 μm width are worked on a slider of alumina titan carbide having the length of 2.0 mm, the width of 1.6 mm and the thickness of 0.4 mm. In this magnetic head too, the resonance frequency is 720 kHz.

Under the above condition, the rotation speed of the magnetic disk medium was fixed at 4500 rpm. At this time, a head unstable-floatation signal was observed over the entire circumference of the magnetic disk medium when the relative speed between the magnetic head and the magnetic disk medium is 9 m/s, that is, at the measurement radius of 19.1 mm. In this investigation too, it was confirmed that a head unstable-floatation signal is generated in the case where the relational expression (1) is satisfied. From this, there was used a magnetic disk medium which has projections with the intervals therebetween changed from 22.5 μm to 45 μm. In this case, no head unstable-floatation signal was generated when the relative speed between the head and the medium is 9 m/s. Accordingly, if a medium having projections which fall within a range satisfying the relational expression (2) is used, the head floats stably.

In either case, the stabilization of the floatation of a magnetic head can be attained if in connection with a magnetic disk medium having projections which are provided on the medium and a part or the whole of which are arranged at regular intervals, the material and size of the head slider, the rotation speed of the medium and the head floatation radius (or the relative speed between magnetic head and the magnetic disk medium) are properly selected so that the relational expression (2) is satisfied.

(Embodiment 3)

Next, a magnetic disk medium including a glass substrate of 65 mmø outer diameter, 20 mmø inner diameter and 0.889 mm thickness having cylindrical projections of 5.7 μm diameter and 25 nm height arranged at intervals of 25.5 μm thereon and including predetermined thin films formed on the substrate was used to float a magnetic head slider in which two worked rails of 200 μm width for receiving a positive floating air pressure are provided on a slider of alumina titan carbide having the length of 1.0 mm, the width of 0.8 mm and the thickness of 0.2 mm. The resonance frequency of this magnetic head slider is 1000 kHz. At this time, a head unstable-floatation signal could be observed at 6.3 m/s, 12.5 m/s, 25.0 m/s and so forth. Then, there was fabricated a magnetic disk apparatus in which the operating range of the magnetic head (or the radial positions of the magnetic head on the magnetic disk medium) is set between 16.0 mm and 22.3 mm with the rotation speed being fixed at 4500 rpm. In this operating range, the relative speed changes between 7.5 m/s and 10.5 m/s. For comparison, a 720 kHz magnetic head slider of alumina titan carbide having the length of 2.0 mm, the width of 1.6 mm and the thickness of 0.4 mm was used to float the head in the same operating range. At this time, the magnetic head slider having the resonance frequency of 1000 kHz generated no beat signal but the magnetic head slider having the resonance frequency of 720 kHz generated a beat signal in a range of relative speeds between 8.0 m/s and 10.0 m/s. Accordingly, it is possible to suppress the beat of the magnetic head when the magnetic head slider is set to a proper operating range.

Though the substrates having the diameters of 95 mm and 65 mm are shown in the foregoing embodiments, the present invention does not depend on the diameter and thickness of a substrate. Namely, the present invention is applicable to substrates having a variety of diameters and thicknesses. Also, the projections provided on the medium includes not only projections formed on the surface of a medium but also projections formed on the surface of a substrate, a projection layer formed in an intermediate layer between a substrate and the uppermost layer of a medium, and projections formed in a substrate. Further, the regularity of intervals between projections may be defined in such a manner that if each projection has a circular form, a distance between the centers of circles of the uppermost portions of projections is measured. In the case where a statistical standard deviation or variance is taken into consideration, the intervals between projections include the changes of ±15% around a central interval value. Therefore, it is not necessary that the surface form of the projection is uniform. If the intervals between projections statistically determined have a certain degree of regularity, the projections fall within the scope of application of the present invention.

Though the foregoing embodiments are mentioned in conjunction with the case where alumina titan carbide is used as a head slider material, the present invention is limited to only such a specified slider material. The present invention is also applicable to all other materials which are suitable as the material of a slider. As described in conjunction with the foregoing embodiments, the present invention does not depend on the form of a slider or is applicable to any case if a resonance frequency as a slider or a magnetic head including a gimbal for supporting the slider and so forth satisfies the relational expression (2).

Also, the head resonance frequency is a characteristic value but is permitted to have the changes of ±15% when variations are taken into consideration.

Further, the present invention is defined by the intervals between projections in a circumferential direction at a specified position on a magnetic disk medium, the resonance frequency of a magnetic head material and the relative speed between the magnetic head and the magnetic disk medium. Therefore, in the case where the intervals between projections on a magnetic disk medium are different between at least two regions, it is possible to make the stable floatation of a magnetic head by changing the relative speed by a controller so that the relational expression (2) is satisfied for a magnetic head having the only resonance frequency. Thereby, it is possible to make the stable floatation of the magnetic head.

According to the present invention as explained in the above in detail, in the case where in connection with a medium having projections which are provided thereon and a part or the whole of which are arranged at regular intervals, a relative speed between a head and the medium is properly selected to satisfy the relational expression (2), there can be provided a high-reliability magnetic disk apparatus in which the stabilization of floatation of the head is attained so that a low floating height of the head corresponding to high-density recording is ensured.

We claim:

1. A magnetic disk apparatus comprising:

a magnetic disk medium having projections provided with a constant regularity on a surface thereof;

a rotating portion for driving the rotation of said magnetic disk medium;

a magnetic head for performing the magnetic recording and reproduction for said magnetic disk medium;

an actuator for moving said magnetic head to a desired position on said magnetic disk medium; and a controller for controlling said rotating portion in accordance with the regularity of said projections provided on said magnetic disk medium, a resonance frequency of said magnetic head and a relative speed of said magnetic disk medium to said magnetic head.

2. A magnetic disk apparatus according to claim 1, wherein said magnetic head is held by said actuator through a magnetic head supporting mechanism, and said controller controls said rotating portion in accordance with a resonance frequency of said magnetic head and said magnetic head supporting mechanism.

3. A magnetic disk apparatus according to claim 1, wherein said magnetic head includes a slider which floats by the rotation of said magnetic disk medium and a magnetic head element provided on said slider for performing the magnetic recording and reproduction for said magnetic disk medium, and said controller controls said rotating portion in accordance with a resonance frequency based on the material and size of said slider.

4. A magnetic disk apparatus according to claim 1, wherein said projections provided on said magnetic disk medium have the regularity of arrangement thereof at predetermined intervals held in the circumferential direction of said magnetic disk medium.

5. A magnetic disk apparatus according to claim 1, wherein said controller controls said actuator to recognize the position of said magnetic head on said magnetic disk medium, thereby obtaining the relative speed of said magnetic disk medium to said magnetic head in accordance with the recognized position of said magnetic head.

6. A magnetic disk apparatus comprising:

a magnetic disk medium having projections arranged with a constant regularity on a surface thereof;

a rotating portion for driving the rotation of said magnetic disk medium;

a magnetic head for performing the magnetic recording and reproduction for said magnetic disk medium;

an actuator for moving said magnetic head to a desired position on said magnetic disk medium; and a controller for controlling said rotating portion so that the intervals l between said projections provided on said magnetic disk medium, a resonance frequency f of said magnetic head and a relative speed v of said magnetic disk medium to said magnetic head satisfies a predetermined relation represented by $$n \times f < v/l \text{ or } n \times f > v/l$$

where n is an integer or 1/integer.

7. A magnetic disk apparatus according to claim 6, wherein said magnetic head is held by said actuator through a magnetic head supporting mechanism, and said resonance frequency f is a resonance frequency of said magnetic head and said magnetic head supporting mechanism.

8. A magnetic disk apparatus according to claim 6, wherein said magnetic head includes a slider which floats by the rotation of said magnetic disk medium and a magnetic head element provided on said slider for performing the magnetic recording and reproduction for said magnetic disk medium, and said resonance frequency f is a resonance frequency based on the material of said slider and the size of said slider.

9. A magnetic disk apparatus according to claim 6, wherein said projections provided on said magnetic disk medium have the regularity of arrangement thereof at predetermined intervals held in the circumferential direction of said magnetic disk medium, and said predetermined intervals in the circumferential direction are said intervals l.

10. A magnetic disk apparatus according to claim 7, wherein said projections provided on said magnetic disk medium have the regularity of arrangement thereof at predetermined intervals held in the circumferential direction of said magnetic disk medium, and said predetermined intervals in the circumferential direction are said intervals l.

11. A magnetic disk apparatus according to claim 8, wherein said projections provided on said magnetic disk medium have the regularity of arrangement thereof at predetermined intervals held in the circumferential direction of said magnetic disk medium, and said predetermined intervals in the circumferential direction are said intervals l.

12. A magnetic disk apparatus according to claim 6, wherein said projection provided on said magnetic disk medium has a height of at least 3 nm.

13. A magnetic disk apparatus according to claim 6, wherein said controller controls said actuator to recognize the position of said magnetic head on said magnetic disk medium, thereby obtaining the relative speed v of said magnetic disk medium to said magnetic head in accordance with the recognized position of said magnetic head.

14. A magnetic disk apparatus according to claim 7, wherein said controller controls said actuator to recognize the position of said magnetic head on said magnetic disk medium, thereby obtaining the relative speed v of said magnetic disk medium to said magnetic head in accordance with the recognized position of said magnetic head.

15. A magnetic disk apparatus according to claim 8, wherein said controller controls said actuator to recognize the position of said magnetic head on said magnetic disk medium, thereby obtaining the relative speed v of said magnetic disk medium to said magnetic head in accordance with the recognized position of said magnetic head.

16. A magnetic disk apparatus according to claim 6, wherein said controller controls said rotating portion so that said predetermined relation is satisfied with the intervals l between said projections on said magnetic disk medium being permitted to have variations within ±15%.

17. A magnetic disk apparatus according to claim 6, wherein said controller controls said rotating portion so that said predetermined relation is satisfied with the resonance frequency f of said magnetic head being permitted to have variations within ±15%.

18. A magnetic disk apparatus according to claim 7, wherein said controller controls said rotating portion so that said predetermined relation is satisfied with the resonance frequency f of said magnetic head and said magnetic head supporting mechanism being permitted to have variations within ±15%.

19. A magnetic disk apparatus according to claim 6, wherein said controller controls said rotating portion so that said predetermined relation is satisfied with the relative speed v of said magnetic disk medium to said magnetic head being permitted to have variations within ±15%.

* * * * *